Patented May 12, 1936

2,040,573

UNITED STATES PATENT OFFICE 2,040,573

PROCESS FOR THE PRODUCTION OF LITHIUM SALTS

Hans Siegens, Goslar, and Oskar Roder, Langelsheim, Germany, assignors to American Lurgi Corporation, New York, N. Y., a corporation of New York No Drawing. Application July 6, 1934, Serial No. 734,027. In Germany July 13, 1933

6 Claims. (Cl. 23—27)

This invention relates to a process for the production of lithium salts from raw materials containing lithium phosphate.

In decomposing minerals, such as amblygonite, containing lithium phosphate, the usual practice is to treat the raw materials, at red heat, with sodium bisulphate in an amount exactly calculated to be equivalent to the lithium, under which conditions the lithium alone is converted into water-soluble sulphate, which is then separated from the insoluble impurities by leaching the calcination product with water. This process, however, has the following defects:—

For the release of one part of lithium in amblygonite, about 17.2 parts of sodium bisulphate are needed, from which about 10.2 parts of sodium sulphate are formed in the calcination. In the ensuing precipitation of the lithium, by means of sodium carbonate, from the aqueous extract of the calcination product, there is produced in accordance with the following equation:—

$$Li_2SO_4 + Na_2CO_3 = Li_2CO_3 + Na_2SO_4$$

a further similar quantity of sodium sulphate per 1 part of lithium, that is to say, about another 10.2 parts of $Na_2SO_4$. Consequently, the residual solution, after the precipitation of the lithium, is relatively rich in $Na_2SO_4$. Moreover, since the precipitation with sodium carbonate is not quantitative, it is necessary to maintain the concentration of the lithium—and therefore, compulsorily, the concentration of the Glauber salt—as high as possible, in order to minimize the relative proportion of unprecipitated lithium.

Decomposition with sodium bisulphate furnishes liquors containing for example 18 grms. of lithium per liter, and therefore about 182.5 grms. of $Na_2SO_4$ per liter in addition to which, in the precipitation of (for example) 15 grms. of lithium per liter with sodium carbonate, some further 152 grms. of $Na_2SO_4$ are introduced. The mother liquor in equilibrium with the precipitated lithium carbonate therefore contains, on the whole, about 334.5 grms. of $Na_2SO_4$ per liter and at boiling heat (at which the precipitation with sodium carbonate is preferably effected) is saturated with Glauber salt to the extent of about 78%.

It has now been found that the lithium cannot be precipitated, from such a highly concentrated solution of Glauber salt, to the same extent as from more dilute solutions of said salt; or, alternatively, that, in the case of solutions with such a high concentration of Glauber salt, a substantially larger excess of sodium carbonate is required to precipitate a given amount of lithium than in the case of more dilute solutions, a circumstance which adversely affects the economy of the process.

A further defect of the high concentration of Glauber salt in the mother liquors consists in that the precipitated lithium carbonate contains a large amount of sodium sulphate which, in spite of its relatively high solubility, cannot be separated, except with very great difficulty, from the lithium carbonate by washing. For some purposes, such as the production of lithium carbonate for pharmaceutical purposes, it is therefore necessary to redissolve in acid the lithium carbonate that has been precipitated from solutions high in sodium sulphate, and reprecipitate the carbonate from solution.

The high sodium sulphate concentration of the mother liquors from the carbonate precipitation also reduces the yield of lithium, because the sodium sulphate in the mother liquors, containing more or less lithium, must be recovered by concentration, and crystallization by cooling, in which operation lithium is carried down and lost, or is recoverable only by means of a troublesome and expensive purifying operation.

It is an object of the present invention to overcome said defects by replacing sodium bisulphate, in decomposing the raw materials that contain lithium and phosphoric acid, by an amount of sulphuric acid equivalent to, or only slightly exceeding, the amount of lithium and other alkalis and alkaline earths of the raw materials, and performing the treatment at temperatures at which the phosphoric acid liberated converts the resulting sulphates of aluminium and iron into phosphates, or oxides, that are insoluble in water, with liberation of sulphur trioxide, but at which temperatures the resulting lithium sulphate is not decomposed and therefore remains soluble in water.

It is known to decompose lithium-containing ores, for example, amblygonite, with sulphuric acid, but the amount of acid hitherto employed was such that the mineral was completely dissolved, except as regards the silica and other constituents insoluble in acids, the maximum temperature employed being the boiling point of the sulphuric acid. This known process has the defect that the recovered liquors contain very large quantities of impurities, the essential removal of which, prior to the precipitation of the lithium, entails the consumption of very large amounts of chemical reagents and, moreover, results in considerable losses of lithium, since, in particular, the aluminium hydroxide separated in the form of a mucinous gel includes a great deal of mother liquor and obstinately retains lithium salts.

On the other hand, according to the process of the present invention, as the result of employing higher decomposition temperatures, apart from the lithium, practically nothing but the other alkali compounds, present in small amount in the raw materials, is converted into the soluble condition, whereas, of the other constituents—especially the troublesome aluminium—only very insignificant amounts, that are easily removed, are converted into the soluble form.

The process may be carried out either in a single stage, for example in a reverberatory furnace (preferably one in which the bottom is also heated from below), or in two stages. In the latter event the procedure consists, for example, in stirring finely ground amblygonite with only a slight excess of sulphuric acid in vessels of suitable material, such as cast iron, and continually stirring the resulting mass, heated to about 100–200° C., until decomposition commences, which is indicated by the formation of foam. In this manner the phosphates of the amblygonite are converted, by the sulphuric acid, into sulphates and free phosphoric acid. The mass, which becomes progressively more pulpy during this conversion process, and solidifies on cooling, is then raised, for example in a reverberatory or rotary-tube furnace and preferably by direct contact with combustion gases, to temperatures at which the sulphates of aluminium and iron first formed are reconverted, by the more refractory phosphoric acid, into phosphates, or oxides, that are insoluble in water, with liberation of $SO_3$, or $SO_2$ and $O_2$, whereas the lithium sulphate is not yet attacked by the phosphoric acid and therefore remains completely soluble in water. Temperatures between dull red heat and about 800–850° C. for example, have been found suitable for this purpose. It is preferable that higher temperatures, at which the lithium sulphate formed in the first conversion process is decomposed by the phosphoric acid, should be avoided, because they result in the formation of sintered, hard products which do not disintegrate in water and from which the contained lithium cannot, or only very incompletely, be extracted with water, even after they have been finely ground.

On the other hand, by selecting the specified calcination temperatures, a calcination product of porous character is obtained, which, therefore, disintegrates readily in the subsequent leaching with water (preferably hot water) and yields up the whole of its lithium to the water. The extracts obtained by the process of the present invention are so pure that, after the small amounts of aliminium present have been thrown down, a lithium carbonate can be precipitated, by means of sodium- or potassium carbonate, which, after repeated washing with water, corresponds directly to the requirements of the German Pharmacopeia VI, so that the redissolving and reprecipitation essential in the case of the products obtained by the known processes are superfluous.

Example I 1000 kgs. of a finely ground amblygonite, with the composition:

| | Per cent |
|---|---|
| $P_2O_5$ | 43.49 |
| $Al_2O_3$ (+traces of $Fe_2O_3$) | 37.20 |
| $SiO_2$ | 3.21 |
| $CaO$ | 1.67 |
| $K_2O$ | 0.15 |
| $Na_2O$ | 1.18 |
| $Li_2O$ | 8.56 | are actively stirred into 550 kgs. of sulphuric acid (about 73% strength) at about 80° C. The temperature is gradually raised to 150–180° C., the material becoming progressively more viscous and gradually pulpy. The material, which sets hard when cold, is transferred to a reverberatory furnace while still warm—that is to say as long as it can still be shovelled—and is heated, with repeated turning, until only slight fumes are given off. There remains about 1175 kgs. of calcination product, which, on being systematically leached with water or with another aqueous liquid, in the usual manner, furnishes about 2 cu. meters of a very pure liquor containing 37.7 kgs. of lithium (corresponding to a yield of 95%). This liquor can be worked up to easily washable lithium carbonate with sodium carbonate, in known manner.

The strength of the sulphuric acid to be employed may vary within fairly wide limits. Thus, for example, water may be added to the aforesaid 73% acid, prior to bringing it into contact with the amblygonite, in order to facilitate the conversion into a paste. The upper limits of dilution of the acid are determined, in general, by the material of the pan used in the heating process—for example, iron, which might be corroded by such highly diluted sulphuric acid—and, on the other hand, by the economic desirability of minimizing the evaporation of water during the heating process.

Example 2

A mixture prepared, in accordance with Example 1, from 1000 kgs. of finely ground amblygonite and 550 kgs. of sulphuric acid (about 73% strength) is heated—with continued stirring and subsequent turning of the gradually solidifying product—in a reverberatory furnace (the bottom of which is preferably also heated from below) until only slight fumes are given off. The resulting 1175 kgs. of calcination product are further treated in the manner described in Example 1.

Example 3

In a cast iron pan mounted above the charging opening of a rotary drum furnace, adapted to be heated by gas in the usual manner, 1000 kgs. of finely ground amblygonite, of the same composition as set forth in Examples 1 and 2, are introduced, with continued stirring, into 840 kgs. of sulphuric acid, of 50% strength, whereupon the temperature is gradually raised to 150–180° C. as in Example 1. After the progressively thickening mass has assumed the condition of pulp, it is charged into the rotary drum furnace, which is lined with acid-resisting fire brick, and is passed through said furnace in counterflow to the heating gases, the rate of feed and temperature of the furnace being controlled in such a manner that the calcined product issuing at the discharge end no longer gives off fumes and has a temperature not exceeding 800° C. Its further treatment, by systematic leaching with water, or other aqueous solvent, is performed in the same manner as set forth in Example 1.

Example 4

In a reverberatory furnace, provided with mechanical stirring and turning devices and the bottom of which consists of a cast iron pan adapted to be heated from below, 1000 kgs. of finely ground amblygonite, of the same composition as set forth in the preceding examples, are introduced into 430 kgs. of sulphuric acid, of specific gravity 1.84. The mixture, which becomes progressively stiffer and harder, is heated at about 750° C., with continued turning, until it ceases to give off fumes. The resulting 1175 kgs. of calcined product are further treated in the manner set forth in Examples 1 to 3.

We claim:—

1. A process for the production of lithium sulfate which comprises heating amblygonite with an amount of free sulphuric acid which is sufficient to combine with the lithium and other alkali and alkaline earth metals present, but at most only slightly exceeds said amount, the heating being conducted first at a temperature at which the aluminum and iron present are transformed into their sulphates and then at a temperature at which the sulphates of aluminum and iron are converted into phosphates and oxides but at which no appreciable decomposition of the lithium sulphate takes place and then separating said lithium sulphate by leaching with an aqueous liquid.

2. A process for the production of lithium sulfate which comprises heating amblygonite with an amount of free sulphuric acid which is sufficient to combine with the lithium and other alkali and alkaline earth metals present, but at most only slightly exceeds said amount, the heating being conducted first at a temperature at which the aluminum and iron present are transformed into their sulphates and then at a temperature between dull red heat and about 850° C. and then separating the lithium sulfate by leaching with an aqueous liquid.

3. A process for the production of lithium sulfate which comprises heating amblygonite with an amount of free sulphuric acid which is sufficient to combine with the lithium and other alkali and alkaline earth metals present, but at most only slightly exceeds said amount, the heating being conducted first at a temperature between about 100° C. and about 200° C. and then at a temperature at which the sulfates of aluminum and iron are converted into phosphates and oxides but at which no appreciable decomposition of lithium sulfate takes place and then separating said lithium sulfate by leaching with an aqueous liquid.

4. A process for the production of lithium sulfate which comprises heating amblygonite with an amount of free sulphuric acid which is sufficient to combine with the lithium and other alkali and alkaline earth metals present, but at most only slightly exceeds said amount, the heating being conducted first at a temperature between about 100° C. and about 200° C. until the mass becomes pulpy and then at a temperature between dull red heat and about 850° C. until the mass ceases to give off appreciable fumes and then separating the lithium sulfate by leaching with an aqueous liquid.

5. A process for the production of lithium sulfate which comprises heating amblygonite in finely divided condition with an amount of free sulphuric acid which is sufficient to combine with the lithium and other alkali and alkaline earth metals present, but at most only slightly exceeds said amount, the heating being conducted first at a temperature at which the aluminum and iron present are transformed into their sulphates and then at a temperature at which the sulphates of aluminum and iron are converted into phosphates and oxides but at which no appreciable decomposition of the lithium sulfate takes place and then separating said lithium sulfate by leaching with an aqueous liquid.

6. A process for the production of lithium sulfate which comprises heating amblygonite with an amount of free sulphuric acid which is sufficient to combine with the lithium and other alkali and alkaline earth metals present, but at most only slightly exceeds said amount, the heating being conducted first indirectly at a temperature between about 100° C. and about 200° C. until the mass becomes pulpy and then directly at a temperature between dull red heat and about 850° C. until the decomposition which occurs at this temperature is substantially complete and then separating lithium sulfate by leaching with an aqueous liquid.

HANS SIEGENS.
OSKAR RODER.